United States Patent [19]

Nichols, Jr.

[11] 3,870,578
[45] Mar. 11, 1975

[54] POLYURETHANE PROPELLANT
[75] Inventor: Peter L. Nichols, Jr., Sacramento, Calif.
[73] Assignee: The United States of America as represented by the Secretary of the Army, Washington, D.C.
[22] Filed: July 24, 1962
[21] Appl. No.: 212,762

[52] U.S. Cl............... 149/19.4, 149/19.92, 264/3 R
[51] Int. Cl............................................. C06d 5/06
[58] Field of Search ........... 149/19, 21, 19.4, 19.92; 264/3 R

[56] References Cited
UNITED STATES PATENTS

| | | | |
|---|---|---|---|
| 2,990,683 | 7/1961 | Walden | 149/19 X |
| 3,022,149 | 2/1962 | Cramer | 149/19 |
| 3,050,423 | 8/1962 | Hudson | 149/19 |
| 3,086,895 | 4/1963 | Schaeffer et al. | 149/19 |
| 3,092,527 | 6/1963 | Schaafsma | 149/19 |
| 3,109,761 | 11/1963 | Cobb et al. | 149/19 |

OTHER PUBLICATIONS

Zaehringer "Solid Propellant Rockets–Second Stage," American Rocket Co., Box 1112, Wyandotte, Michigan, 1958, pp. 203–219.

Primary Examiner—Leland A. Sebastian
Assistant Examiner—E. A. Miller
Attorney, Agent, or Firm—Eugene E. Stevens, III

EXEMPLARY CLAIM

4. A propellant composition comprising
   a. an oxidizing salt,
   b. a polyurethane fuel,
   c. a ferric acetyl acetonate curing catalyst,
   d. a wetting agent, and
   e. a burning rate catalyst comprising copper chromite.

12 Claims, No Drawings

POLYURETHANE PROPELLANT

This invention relates to composite polyurethane propellants. In general, the polyurethane binders are derived by reacting polymeric diols, of the type derived from epoxides such as

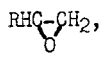

with 2,4-toluene diisocyanate and a trifunctional alcohol for cross-linking.

Prior to the present invention, efforts to develop a suitable resin binder for ammonium perchlorate and ammonium nitrate were pursued. Acrylic ester polymers, epoxide resins, and plasticized polyvinyl alcohol compositions were investigated but each of these classes of materials had limitations with respect to mechanical properties which confined the corresponding propellant compositions to cartridge-charge applications. The inability of these propellants to withstand case-bonded applications limited the utility of the corresponding resin binders to an undesirable extent. Thus, a class of materials was sought which comprised rubbers of characteristically good physical properties and which exhibited these properties when bulk-polymerized in complex formulations containing oxidants, surface-active agents, etc.. The most promising synthetic rubbers were the polyurethanes.

The primary object of this invention is to develop a polurethane propellant having satisfactory physical properties.

Another object of the present invention is to produce a polyurethane propellant having acceptable tensile strength.

A further object of this invention is to produce a polyurethane propellant having good elongation.

Other and further objects will become apparent from the following disclosure.

It has been determined that for a propellant to withstand successfully all types of case bonding, a minimum elongation of at least 10 or 20 percent is required. Actually, the elongation should be larger so that the extra strains imposed on the propellant, such as produced by (1) the difference in coefficients of expansion, (2) the accelerations due to launching and to ignition, and (3) the conditions imposed near burnout by some charge designs, can be withstood. A propellant having an elongation of 20 to 25 percent at all service temperatures and potential rates of strain should be suitable for any case-bonding applications. Polyurethane rubbers have been found to provide propellants with the necessary properties.

Polyurethane rubbers, in general, are well known in the rubber art. The variety of rubbers employed in the present invention is derived from the addition reaction of polyfunctional isocyanates with a variety of polyfunctional materials which contain active hydrogen atoms. The important feature of materials produced in this manner is that polymeric glycols of any desired molecular weight can be used initially. By using glycols having molecular weights of 1000 to 4,000, the shrinkage and heat of polymerization of the propellant mix, as it is cured to form the propellant grain, can be reduced to an optimum level.

Two classes of polymeric materials with terminal hydroxyl groups commercially available in large quantities have been used extensively in the formulation of polyurethane rubbers. These materials are polyesters in which the carboxyl terminal groups are kept at a low level by reacting excess alcohol with polyfunctional carboxylic acids, and polyglycols synthesized from epoxides such as ethylene oxide and propylene. The isocyanates most often used are the commercially available aromatic diisocyanates such 2, 4-toluene diioscyanate. Investigations have shown that use of 2, 4-toluene diioscyanate with commercially available polypropylene glycols produces rubbers with brittle points as low as −85°F. Consequently, emphasis has been placed on the polyglycols as the main ingredient (on weight basis) for polyurethane rubber formulations. A further reason for selecting polyglycols is the fact that a wide variety of polyglycols can be produced by the polymerization of epoxides of the type

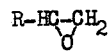

where R can be varied widely. When R- is $CH_3$-, the corresponding polymer is polypropylene glycol. A rubber of relatively high energy content is obtained if R- is $O_2NOCH_2$- and the corresponding polymeric glycol is polyglycidyl nitrate. Ballistic advantages may be obtained by incorporating a nitrate group in the resin binder.

Resin formulations

The most significant variable in determining the physical and chemical properties of the polyurethane rubber is the chemical structure of the polyol. A wide selection of polyols is available through polymerization of an epoxide of the form

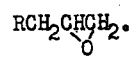

Other polyols which exhibit utility are represented by $HO(CHCH_2O)_nH$ where R- represents

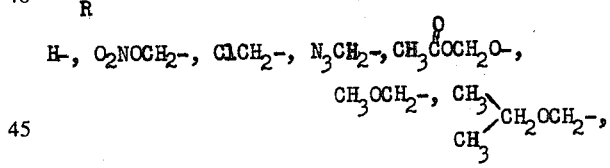

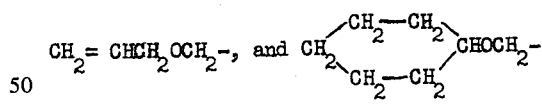

and $n$ is the number of repeating ether units. The types of structures possible with these polyols are as follows:

1. Each polyol can be prepared in any desired molecularweight range. Usually a molecular-weight range of 3000 to 4000 is a practical upper limit from the standpoint of viscosity or crystallinity.
2. Co-Polymeric polyols can be formed by combinations of each of the epoxides.
3. High energy and fast burning are introduced into the structure with nitrate or azide groups (R is $O_2NOCH_2$- or $N_3CH_2$-).
4. A special mode of cross linking is possible by using the acetoxy group (R is $CH_3COCH_3O$-). A copolymer of glycidyl acetate and one of the other parent epoxides is made in which the acetoxy group is distributed along the polyol chain in some statistically achievable repetitive pattern. the acetoxy groups are removed by hydrolysis, and the resulting polyol can be reacted directly with the isocyanate to form the typical cross-linked rubber network.

5. Introduction of the allyl group (where R is $CH_2=CHCH_2O-CH_2$) offers the possibility of producing polyurethane rubbers which can be vulcanized by conventional methods used with natural rubber.

6. Effects of bulky side chains on extensibility and lowtemperature properties can be achieved by comparing rubbers based on polyols where R represents H-, $CH_3$-,

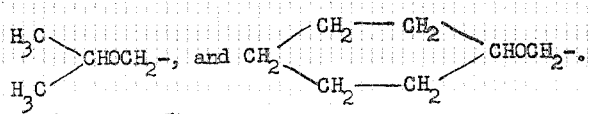

polybutylene oxide in the formulations. Although the reason for the improvement is not completely understood, it is possible that it is related to a reduction in the amount of clumped structures which could arise from an excessive amount of triol reaction with the isocyanate.

The triol content was varied in other formulations containing polypropylene glycol, triisopropanolamine, and 2,4-toluene diisocyanate. With the usual amount of cross-linking agent, this composition was extremely hard and stiff. Lowering the triol content resulted in compositions with extremely good elongation (600 to 700 percent), but they showed a considerable amount of delayed elasticity with little or no secondary creep. Triols which were employed most successfully were 1, 2, 6-hexanetriol, triisopropanolamine, and Triol 230.

Some of the polyurethane resin formulations are set forth in the following table.

TABLE I

| Components | Polyurethane Resin Formulae | | | |
|---|---|---|---|---|
| | JPL X500 | | JPL X360 | |
| | (wt %) | (mol) | (wt %) | (mol) |
| Diols | | | | |
| Polypropylene glycol 2025[1] | 79.7 | 0.364 | 81.2 | 0.438 |
| Polypropylene glycol 3000[1] | — | — | — | — |
| Polypropylene glycol 150[1] | — | — | — | — |
| Triethylene glycol | — | — | — | — |
| Diisocyanate | | | | |
| Toluene diisocyanate[2] | 15.8 | 1.000 | 14.9 | 1.000 |
| Triols | | | | |
| Hexane Triol[3] | 4.1 | 0.335 | 3.8 | 0.333 |
| Triol 230[4] | — | — | — | — |
| Triisopropanolamine | — | — | — | — |
| Curing catalyst | | | | |
| Ferric acetyl acetanate | 0.35 | — | 0.011 | — |
| Ratio of isocyanate to alcohol | 1.15 | — | 1.07 | — |
| Polymer weight per mole of cross-linking agent (gm/gm mol) | 3280 | — | 3510 | — |

[1] Polyether diols
[2] 2, 4-toluene diisocyanate
[3] 1, 2, 6-hexane triol
[4] $HOCH_2CH_2OCH_2C(CH_3)(CH_2OH)CH_2CH(CH_3)CH_2OH$ Rubber properties may also be varied by polymerizing a given epoxide in the presence of a polyfunctional alcohol. If the reaction is conducted under conditions which lead to stepwise addition of epoxide units to the alcoholic group, a multichain or branched polyol is produced in which the chains emanating from the branch point are all approximately equal in length. Such structures yield polymers with the physical characteristics of linear polymers.

It was found that combination of a polypropyline glycol, a troil, and 2, 4-toluene diisocyanate in which the triol content was from 0.6 to 1.5 moles did not produce significant changes in elongation, modulus, or brittle temperature, but when the triol content of less than 0.6 mole was used, the composition did not cure completely. When a constant mole ratio of diol to triol was maintained, lowermolecular-weight diols gave hard, brittle polymers, and highermolecular-weight diols resulted in softer and weaker polymers.

A significant improvement in the physical properties of the 2, 4-toluene diisocyanate-polypropylene glycol was made by incorporating low-molecular-weight diols, such as, triethylene glycol, diethylene glycol, 2, 5 hexanediol, ethylene glycol, polypropylene glycol, and Resin curing catalysts The polymerization reaction is catalyzed by some metal chelates compounds. Among the curing catalysts found to be more suitable are cobaltic acetyl acetonate, lead naphthenate, cobalt naphthenate, and ferric acetyl acetonate. Ferric acetyl acetonate was the most satisfactory polymerization modifier and, accordingly, the preferred catalyst.

Propellant compositions

Two basic propellant compositions have been developed using polyurethane binders for the fuel component. One propellant composition primarily consists of ammonium perchlorate and a polypropylene glycol -2, 4-toluene diisocyanate designated JPL X500, and the other propellant primarily consists of ammonium nitrate and the resin designated JPL X360.

Bimodal mixtures of the oxidizers were employed to aid in fluidity for mixing and casting. Both ammonium nitrate and ammonium perchlorate bimodal mixtures consist of 70 percent unground material, the bulk of which is 100 mesh, and 30 percent ground to 10 to 30 microns.

Satisfactory cast grains have been made containing 70 to 77 percent by weight of ground solid oxidizer and the resinous fuelbinder comprising the remainder. By using wetting agents and bimodal particle size distribution it was possible to achieve sufficent fluidity that compositions containing up to 85 percent by weight of the solid oxidizer could be cast.

The following table gives two specific embodiments of the JPL X500 propellant composition.

TABLE II

| Ingredient | Composition of JPL X500 Wt % of Propellant | | Wt % of Binder[b] |
|---|---|---|---|
| | 70% Oxidizer | 80% Oxidizer | |
| Ammonium perchlorate [g] | | | |
| ground[a] | 21.0 | 24.0 | |
| unground[a] | 49.0 | 56.0 | |
| Polypropylene glycol 2025 (PPG) | 23.9 | 15.9 | 79.6 |
| Ferric acetyl acetonate (FAA) | 0.1 | 0.08 | 0.4 |
| Tolylene diisocyanate (TDI) | 4.8 | 3.2 | 16.0 |
| 1, 2, 6 Hexanetriol (HT) | 1.2 | 0.8 | 4.0 |

[a]A bimodal oxidizer system is used in this propellant, consisting of 30% ground and 70% unground ammonium perchlorate.
[b]Weight of plasticizer and/or surfactant used is subtracted from weight of binder in propellant.

Storage of JPL X500 propellant at 160°F. for limited periods of time affects the material only in a minor way. Two groups of test bars machined from two batched of JPL X500 propellant were subjected to tensile tests on the Instron machine after having been stored for various lengths of time, one group at 160°F. and the other at ambient temperature. The tensile strength was increased by the additional heating, though the increase was small (the averages of tensile strengths of specimens aged at room and elevated temperatures were 186.9 and 198.1 psi with standard deviations of 11.4 and 12.0, respectively). No such certainty was evident for the decrease in elongation (24.0 and 21.5percent with standard deviations of 5.3 and 3.6, respectively). These hightemperature storage tests have not revealed any major weakness in the polyurethane propellants.

Burning Catalysts

These composite propellants employing the polyurethane fuel binder composed essentially of polypropylene glycol and toluene diisocyanate have a number of interesting burning characteristics. Uncatalyzed, they burn very slowly. The uncatalyzed propellant with 70 percent by weight ammonium nitrate (X360) does not burn at all in the Crawford bomb; 70 percent by weight ammonium perchlorate (X500), uncatalyzed, burns at a rate of about 0.16 in./sec., but at pressures over 1800 psi it also fails to support combustion. Another interesting feature of the uncatalyzed JPL X500 is a pronounced plateau relationship at 500 to 2,000 psi. Several of the ballistic modifiers tried in the amount of 1 to 2 percent by weight brought the rate up to the desirable range at 0.03 in./sec. and faster. In nearly all cases, the pressure exponent is also raised; however, one catalyst, copper chromite, retains the plateau relationship at pressures from 1,000 to 2,000 psi at a burning rate considerably higher than that of the uncatalyzed propellant.

JPL X360 propellant in which 1 percent of the 70 percent of the ammonium nitrate has been replaced with ammonium dichromate sustains combustion in the Crawford bomb. Its burning rate at 1,000 psi is 0.045 in./sec., and the pressure exponent is 0.67. Copper chromite gives similar results.

Copper chromite is an extremely active burning catalyst for JPL X500 propellant and it also is the most efficient. Not only is its accelerating capacity almost as good as that of tetraethyl orthosilicate, but a very low pressure exponent obtains above 1,000 psi. This material behaves very well in motor combustion. Apparently the catalyzing property of the copper chromite is subordinated to the tendency of the uncatalyzed propellant to form plateaus at higher pressures. Thus copper chromite catalyst not only produces acceptable rates (0.3 to 0.4 in./sec) but also tends to preserve the natural plateau characteristics of the propellant above 1,000 psi.

Surface-active Agents

Certain inadequate physical properties of the JPL X propellants due to adhesion of the resin binder to the oxidant particles may be overcome by addition of surface-active modifiers to the compositions. The polar residue of a suitable wetting agent adheres to the oxidant particles, leaving the non-polar portion as an effective surface film around the particle. Particles coated in this manner have much less tendency to adhere to the resin binder, and the result of having a "diluted" resin binder is achieved.

Proper choice of a wetting agent is influenced by the chemistry of the curing reaction. The isocyanate group reacts rapidly with hydroxyl, amine, and carboxyl groups. Therefore many surfactants are excluded for consideration because of their unfavorable side reactions. In some cases, however, wetting agents containing these groups react sufficiently slowly so that they can be used.

Only three surfactants were found that would not interfere with the curing mechanism of the propellant; they were Ionol, Shell Chemical Co., 2,6 ditertiary butyl-4 methyl phenol; Surface-active Agent BPE, American Cynamide Co., Bis(2-p-tertiary butylphenoxyethyl) sodium sulfosuccinate; and Tween 20, Atlas Powder Co., polyoxyethylene sorbitan monolaurate. The Ionol surfactant was the first compound tested that did not react and it gave the best over-all effect, particularly in reducing viscosity. It has been determined that a maximum surfactant concentration of 1 percent by weight achieves the best physical properties. Amounts above this concentration were detrimental to the propellant.

PLASTICIZERS

The use of plasticizers in propellant compositions has both advantages and disadvantages. It appears that the disadvantages of using a plasticizer in the polyurethane resins alone outweight the advantages, however, when the plasticizer is added to the propellant composition containing an oxidizer and a polyurethane resin, the advantages become dominant. The disadvantages of using a plasticizer in the propellant composition are usually related to plasticizer migration. Among the numerous advantages are (1) the improvement in physical properties, such as greater elongation and lower brittle point, (2) the improvement in castability resulting from lower mix viscosity and reduced curing rate, (3) the lowering of shrinkage and curing exotherm, (4) the simplification of the introduction of high energy materials into the propellant binder, and (5) the reduction in the interaction between resin binder and oxidant particles.

Dioctyl azelate, dioctyl sebacate, and TP 90B in concentrations up to about 10 percent by weight, and preferably about 10 percent, of the total propellant composition give the best results. Dioctyl azelate is the best plasticizer as far as over-all performance is concerned. Dioctyl sebacate is also good, but migration may occur in the propellant upon storage. TP 90B, Thiokol Corporation, $(C_4H_9OC_2H_4OC_2H_4O)_2CH_2$, gave the most impressive results in reducing the viscosity of the propellant mix, but the cured propellant exhibited a high brittle-point temperature of -30°F., when used at the 80 percent oxidizer levels.

The following table illustrates the action of the plasticizer and wetting agent, separately and in combination, on JPL X500 fuel-binder containing 70 percent by weight oxidizer. The mix was extremely fluid, and some settling of the oxidizer was observed in the uncured propellant. The physical properties of the propellant were unchanged for the most part, although the tensile strength was decreased slightly.

blended solids, polypropylene glycol and hexane triol, are premixed under a vacuum of 0.5 to 10 mm Hg and a temperature of 60°F. to 75°F. for 30 minutes or more, depending on extent of gas removal. When the premix is essentially gas-free, the toluene diisocyanate is admixed, and the material is vacuum-mixed for 10 minutes. The propellant mixture is then cast with vacuum and vibration in Teflon-coated molds. The molds are placed in water baths held at 120°F. to 140°F. for 16 hours. Cured grains are pressed from molds and mandrels in a hydraulic press. Release from the Teflon-coated metal surfaces is so easy that hydraulic presses of 500 psi are usually adequate.

In the other procedure, all solid materials are tumbled for 30 minutes. The blended solids, polypropylene glycol and hexane triol, are premixed under a vacuum of 0.5 to 10 mm Hg and a temperature of 120°F. for 3 to 5 hours, depending on the extent of gas removal. When the premix is essentially gas-free, the admixture of toluene diisocyanate is accomplished with individual charge batches (of 100 to 1200 gm), necessitating the separate weighting of premix and isocyanate for each charge. This mixing is done gently by hand with a spatula in a metal beaker. As soon as a uniform blend is obtained, the mix is poured into the mold with the aid of vibration (no vacuum). Molds are vibrated without vacuum, and the subsequent treatment is the same as in the previous procedure.

Several advantages exist in using the first procedure over the second procedure, in addition to less occluded gas. No special equipment is required for heating during mixing, and the lower temperature allows for longer

TABLE III

Variation of Physical Properties of JPL X500 Propellant[a] with Addition of a Plasticizer and a Surface-Active Agent

| Compound Added | Tensile Strength (psi) at | | | Elongation (%) at | | | Initial Modulus (psi) at | | |
|---|---|---|---|---|---|---|---|---|---|
| | −40°F | 80°F | 160°F | −40°F | 80°F | 160°F | −40°F | 80°F | 160°F |
| None | 1,355 | 155 | 130 | 5.3 | 11.2 | 6.6 | 79,000 | 3,840 | 4,000 |
| Ionol (1%) | 934 | 120 | 76 | 12.0 | 12.6 | 6.4 | 41,500 | 2,765 | 3,235 |
| Dioctyl azelate(10%) | 310 | 80 | 61 | 37.0 | 16.2 | 11.0 | 3,095 | 1,120 | 1,145 |
| Ionol(1%) and dioctyl azelate (10%) | 263 | 69 | 49 | 44.0 | 14.0 | 8.4 | 2,945 | 985 | 735 |

[a]Composition: ammonium perchlorate 70% and polyurethane binder 30% (includes plasticizer and/or surfactant weight).

It is suggested that dioctyl azelate is not completely soluble in the resin. This assumption would explain the good physical properties obtained at -40°F. and the marginal ones obtained at 80°F. and 160°F.. As the temperature of the propellant is lowered, the plasticizer apparently migrates out of the resin and coats the oxidizer particles. This action tends to decrease the attraction between the resin and the oxidizer, thus allowing the resin to exhibit more of its own physical properties than that of the composite propellant. As the temperature is increased, the plasticizer migrates back into the resin, thus allowing the attraction between it and the oxidizer once again to effect the physical properties of the propellant.

Process

Two procedures have been developed for processing JPL X500 propellants. In one procedure, all solid materials are tumbled for 30 minutes. The solids consist of two particle sizes of ammonium perchlorate, solid burning-rate catalysts, and ferric acetyl acetonate. The pot life before the mix becomes too viscous to cast. The one advantage of the second procedure is that the mix is more fluid as long as it is cast without delay.

A slightly different procedure is employed for the mixing of JPL X360 propellants. All solid materials are tumbled for 30 minutes to obtain a uniform composition. The solids consist of two sizes of ammonium nitrate for the bimodal blend plus burning-rate catalysts which are in powdered form. The blended solids and the polypropylene glycol are then premixed in a vacuum mixer under a vacuum of 0.5 to 10 mm Hg, temperature of 55° to 70°F., and a duration of 30 minutes or longer. The duration is decided upon by the examination of the mix for continued bubbling under vacuum and also by the degree of mix collapse when the vacuum is suddenly relieved. When the premix is essentially gas-free, the toluene diisocyanate with curing catalyst dissolved in it is admixed, and the material is vacuum-mixed for 10 minutes or longer. Then the hexane triol is admixed, and vacuum mixing is continued for 10 minutes. These two materials may be added by suitable injection means while the mix is still being agitated under vacuum. The mixture is immediately vacuum-cast in Teflon-coated molds with mild vibration. The filled molds are vibrated 30 minutes with vacuum and then 30 minutes without vacuum. The molds are then placed in hot water baths and the subsequent treatment is the same as the first procedure above.

All of the materials are pretreated to remove water and gases before being used in propellant processing. The oxidizer salts, ammonium perchlorate and ammonium nitrate, are kept in an atmosphere of 10percent to 35percent relative humidity. All the resin components must be degassed before use. Polypropylene glycol is degassed by holding the material at 150°C.(lower for lower molecular weight polyglycols) for 4 hours under a vacuum of 0.5 to 6 mm Hg with a small nitrogen purge. The triols and the toluene diisocyanate are stored in a desiccator under vacuum for at least 30 to 60 minutes before use.

The removal of water and other impurities by prior degassing of all ingredients is given the credit for most of the process improvement, together with many other items of technique such as temperature selection and better vaccum. It is now believed that the removal of nascent carbon dioxide from the toluene diisocyanate by degassing is the factor which made it possible to agitate under vacuum and to vacuum-cast the propellant. Apparently the premixing operation employed in these procedures is sufficient to remove water and other troublesome materials from the surfaces of oxidizer particles.

I claim:

1. A polyurethane propellant composition comprising
   a. an oxidizing salt, selected from the group consisting of ammonium nitrate and ammonium perchlorate,
   b. a polymeric diol having the formula

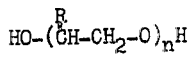

where R is selected from the group consisting of CH$_3$- and O$_2$NOCH$_2$-,
   c. 2, 4-toluene diisocyanate,
   d. a trihydroxy alcohol,
   e. a catalyst from the group consisting of cobaltic acetyl acetonate, cobalt naphthenate, and ferric acetyl acetonate, and
   f. a plasticizer selected from the group consisting of dioctyl azelate and dioctyl sebacate--;

2. A propellant composition comprising
   a. 70 to 85 percent by weight of an oxidizer, selected from the groups consisting of ammonium nitrate and ammonium perchlorate-;
   b. a polyurethane fuel, the remainder.

3. A polyurethane propellant composition comprising
   a. an oxidizer salt consisting of 70 percent by weight of unground 100 mesh particles and 30 percent by weight of ground 10 to 30 micron particles, selected from the groups consisting of ammonium nitrate and ammonium perchlorate
   b. a polymeric glycol having a molecular weight of from 1,000 to 4,000,
   c. 2, 4-toluene diisocyanate,
   d. a trihydroxy alcohol,
   e. a curing catalyst from the group consisting of cobaltic acetyl acetonate, cobalt naphthenate, and ferric acetyl acetonate,
   f. a plasticizer and selected from the group consisting of dioctyl azelate and dioctyl sebacate-
   g. a burning rate catalyst.

4. A propellant composition comprising
   a. an oxidizing salt,
   b. a polyurethane fuel,
   c. a ferric acetyl acetonate curing catalyst,
   d. a wetting agent, and
   e. a burning rate catalyst comprising copper chromite.

5. A polyurethane propellant composition comprising
   a. an oxidizing salt consisting of 70 percent by weight of unground 100 mesh particles and 30 percent by weight of ground 10 to 30 micron particles, selected from the group consisting of ammonium nitrate and ammonium perchlorate;
   b. a polymeric glycol having a molecular weight of from 1,000 to 4,000,
   c. 2, 4-toluene diisocyanate,
   d. a trihydroxy alcohol,
   e. a ferric acetyl acetonate,
   f. a surface-active agent,
   g. a plasticizer, and
   h. a burning-rate catalyst comprising copper chromite.

6. A polyurethane propellant composition having improved elongation comprising:
   a. 70 to 85 percent by weight of an oxidizing salt, selected form the group consisting of ammonium nitrate and ammonium perchlorate-;
   b. 1 to 2 percent by weight of a burning-rate catalyst comprising copper chromite,
   c. about 1 percent by weight of a surface-active agent, and
   d. the remainder a polyurethane fuel.

7. A process for producing a polyurethane propellant composition having improved elongation comprising
   a. mixing an oxidizer selected from the group consisting of ammonium nitrate and ammonium perchlorate; and a polymeric glycol and trihydroxy alcohol under a vacumm, and
   b. admixing 2, 4-toluene diisocyanate with said oxidizer, polymeric glycol, and trihydroxy alcohol mix.

8. A process for producing a polyurethane propellant grain having improved elongation comprising
   a. mixing an oxidizer selected from the group consisting of ammonium nitrate and ammonium perchlorate and a polymeric glycol and triol under vacuum,
   b. mixing 2, 4-toluene diisocyanate with said oxidizer, polymeric glycol, and triol mix under vaccum, and
   c. curing the grain in a heated mold.

9. A process for producing a polyurethane propellant compostion having improved physical properties comprising:
   a. mixing a solid oxidizing agentselected from the group consisting of ammonium nitrate and ammonium perchlorate and a polymeric glycol and triol under vacuum at an elevated temperature, and
   b. admixing 2, 4-toluene diisocyanate with said oxidizing agent, polymeric glycol, and triol mix.

10. A process for producing a polyurethane propellant grain having improved physical properties comprising
  a. mixing a premix of a solid oxidizing salt selected from the group consisting of ammonium nitrate and ammonium perchlorate and a polymeric glycol and triol under vacuum at an elevated temperature,
  b. separately weighing batches of said premix and 2, 4-toluene diisocyanate,
  c. admixing said premix and 2, 4-toluene diisocyanate, and
  d. curing the grain in a heated mold.

11. A process for producing a polyurethane propellant composition having improved physical properties comprising
  a. mixing a premix of a solid oxidizing salt selected from the group consisting of ammonium nitrate and ammonium perchlorate and a polymeric glycol under vaccum,
  b. admixing 2, 4-toluene diisocyanate and a curing catalyst into said premix under vacuum,
  c. then adding and mixing a triol into said 2, 4-toluene diisocyanate, curing catalyst and premix under vacuum,
  d. casting the resulting mixture with vacuum and vibration, and
  e. curing the grain in a heated mold.

12. A process for producing a polyurethane propellant grain having improved physical properties comprising
  a. heating a polymeric glycol at an elevated temperature for 4 hours under a vacuum,
  d. drying a triol and 2, 4-toluene diisocyanate, drying an oxidizing salt, selected from the group consisting of ammonium nitrate and ammonium perchlorate.
  d. mixing a premix of said oxidizing salt and said polymeric glycol under vaccum,
  e. admixing 2, 4-toluene diisocyanate and a curing catalyst into said premix under vacuum,
  f. then adding and mixing a triol into said 2, 4-toluene diisocyanate, curing catalyst, and premix under vacuum,
  g. casting the resulting mixture with vacuum and vibration, and
  h. curing the grain in a heated mold.

* * * * *